US008645429B1

(12) United States Patent
Bik et al.

(10) Patent No.: US 8,645,429 B1
(45) Date of Patent: Feb. 4, 2014

(54) RESOLVING CONFLICTING GRAPH MUTATIONS

(75) Inventors: Aart J. C. Bik, Union City, CA (US); Matthew H. Austern, Palo Alto, CA (US); James C. Dehnert, Palo Alto, CA (US); Grzegorz Czajkowski, Redwood City, CA (US); Grzegorz Malewicz, Tokyo (JP); Naty Leiser, Haifa (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/432,806

(22) Filed: Mar. 28, 2012

Related U.S. Application Data

(60) Provisional application No. 61/477,559, filed on Apr. 20, 2011, provisional application No. 61/483,183, filed on May 6, 2011.

(51) Int. Cl.
*G06F 7/00* (2006.01)
*G06F 17/30* (2006.01)
*G06F 11/20* (2006.01)

(52) U.S. Cl.
CPC .... *G06F 17/30958* (2013.01); *G06F 17/30961* (2013.01); *G06F 2221/0793* (2013.01); *G06F 11/2082* (2013.01)
USPC ........... 707/798; 707/797; 707/805; 707/808; 717/144

(58) Field of Classification Search
CPC .................. G06F 17/30958; G06F 2221/0793; G06F 11/2082
USPC .................... 707/797, 798, 805, 808; 717/144
See application file for complete search history.

(56) References Cited

U.S. PATENT DOCUMENTS

| 5,734,833 | A  | * | 3/1998  | Chiu et al. ........... 709/225 |
| 8,429,110 | B2 | * | 4/2013  | Cai et al. ........... 706/45 |
| 8,458,229 | B2 | * | 6/2013  | Oliver et al. ........... 707/808 |
| 2006/0212860 | A1 | * | 9/2006  | Benedikt et al. ........... 717/144 |
| 2008/0216077 | A1 | * | 9/2008  | Emani et al. ........... 718/102 |
| 2008/0271022 | A1 | * | 10/2008 | Strassner et al. ........... 718/100 |
| 2009/0055343 | A1 | * | 2/2009  | Van Lunteren ........... 706/48 |
| 2010/0017537 | A1 | * | 1/2010  | Linnartz et al. ........... 709/241 |
| 2011/0307436 | A1 | * | 12/2011 | Cai et al. ........... 706/48 |
| 2011/0314075 | A1 | * | 12/2011 | Boldyrev et al. ........... 709/201 |

OTHER PUBLICATIONS

Anderson, T., et al., "High-Speed Switch Scheduling for Local-Area Networks," *ACM Trans. Comp. Syst.* 11(4): 319-352, 1993.
Bader, D., et al., "Designing Multithreaded Algorithms for Breadth-First Search and *st*-connectivity on the Cray MTA-2," in *Proc. 35th Intl. Conf. on Parallel Processing* (ICPP'06), Columbus, Ohio, Aug. 2006, pp. 523-530.
Barroso, L., et al., "Web search for a planet: The Google Cluster Architecture," *IEEE Micro* 23(2):22-28, 2003.

(Continued)

*Primary Examiner* — Phong Nguyen
(74) *Attorney, Agent, or Firm* — Fenwick & West LLP (57) ABSTRACT

Resolving conflicting graph mutations in a distributed computing system. Graph data for at least a partition of a graph is stored in a worker system of a distributed computing system. The graph represents relationships among a set of tangible items that model a real-world condition having an associated problem. A plurality of conflicting mutation requests are received to mutate the graph. A conflict between the mutation requests is resolved with a conflict resolution function that lacks direct access to the graph data. The graph data is updated responsive to a result generated by resolving the conflict using the conflict resolution function.

15 Claims, 5 Drawing Sheets

(56) References Cited

OTHER PUBLICATIONS

Bayati, M., et al., "Maximum Weight Matching via Max-Product Belief Propagation," in *Proc. IEEE Intl. Symp. on Information Theory*, pp. 1763-1767, 2005.
Bellman, R., "On a routing problem," *Quarterly of Applied Mathematics 16*(1):87-90, 1958.
Bonorden, O., et al., "The Paderborn University BSP (PUB) library," *Parallel Computing 29*:187-207, 2003.
Brin, S., et al., "The Anatomy of a Large-Scale Hypertextual Web Search Engine," in *Proc. 7th Intl. Conf on the World Wide Web*, pp. 107-117, 1998.
Chan, A., et al., "CGMGRAPH/CGMLIB: Implementing and Testing CGM Graph Algorithms on PC Clusters and Shared Memory Machines," *Intl. J. of High Performance Computing Applications 19*(1):81-97, 2005.
Chang, F., et al., "Bigtable: A Distributed Storage System for Structured Data," *ACM Trans. Comp. Syst. 26*(2) Article 4, 26 pages, 2008.
Cherkassky, B., et al., "Shortest paths algorithms: Theory and experimental evaluation," *Mathematical Programming 73*:129-174, 1996.
Cohen, J., "Graph Twiddling in a MapReduce World," *Comp. in Science & Engineering*, pp. 29-41, Jul./Aug. 2009.
Crobak, J., et al., "Advanced Shortest Paths Algorithms on a Massively-Multithreaded Architecture," in *Proc. First Workshop on Multithreaded Architectures and Applications*, pp. 1-8, 2007.
Czajkowski, G., "Large-scale graph computing at Google," Google Research Admin., Jun. 2009, 1 page, [online][retrieved Jul. 20, 2012] retrieved from the internet <http://googleresearch.blogspot.com/2009/06/large-scale-graph-computing-at-google.html>.
Daly, J., "A higher order estimate of the optimum checkpoint interval for restart dumps," *Future Generation Computer Systems 22*:303-312, 2006.
Dean, J., et al., "MapReduce: Simplified Data Processing on Large Clusters," in *Proc. 6th USENIX Symp. on Operating Syst. Design and Impl.*, pp. 137-150, 2004.
Dijkstra, E., et al., "A Note on Two Problems in Connexion with Graphs," *Numerische Mathematik 1*:269-271, 1959.
Erwig, M., "Inductive graphs and functional graph algorithms," *J. Functional Programming 11*(5):467-492, Sep. 2001.
Ghemawat, S., et al., "The Google File System," in *Proc. 19th ACM Symp. on Operating Syst. Principles*, pp. 29-43, 2003.
Google Project Hosting, "Protobuf: Protocol Buffers—Google's data interchange format," 2 pages, [online] [retrieved Jul. 20, 2012] retrieved from the internet <http://code.google.com/p/protobuf/2009>.
Goudreau, M., et al., "Portable and Efficient Parallel Computing Using the BSP Model," *IEEE Transactions on Computers 48*(7): 670-689, 1999.
Gregor, D., et al., "Lifting Sequential Graph Algorithms for Distributed-Memory Parallel Computation," in *Proc. of Parallel Object-Oriented Scientific Computing (POOSC)*, 15 pages, Jul. 2005.
Gregor, D., et al., "The Parallel BGL: A Generic Library for Distributed Graph Computations," in *Proc. 2005 ACM SIGPLAN Conf. on Object-Oriented Prog., Syst., Lang., and Applications (OOPSLA'05)*, pp. 423-437, Oct. 2005.
Hagberg, A., et al., "Exploring Network Structure, Dynamics, and Function using NetworkX," in *Proc. 7th Python in Science Conf.*, pp. 11-15, 2008.
Hill, J., et al., "BSPlib: The BSP programming library," *Parallel Computing 24*:1947-1980, 1998.
Isard, M., et al., "Dryad: Distributed Data-Parallel Programs from Sequential Building Blocks," in *Proc. European Conf. on Computer Syst.*, pp. 59-72, 2007.

Kang, U., et al., "PEGASUS: A Peta-Scale Graph Mining System—Implementation and Observations," in *Proc. Intl. Conf. Data Mining*, pp. 229-238, 2009.
Lumsdaine, A., et al., "Challenges in Parallel Graph Processing," *Parallel Processing Letters 17*:5-20, 2007.
Madduri, K., et al., "A Faster Parallel Algorithm and Efficient Multithreaded Implementations for Evaluation Betweenness Centrality on Massive Datasets," in *Proc. 3rd Workshop on Multithreaded Architectures and Applications (MTAAP'09)*, Rome, Italy, May 2009, 8 pages.
Madduri, K., et al., "Parallel Shortest Path Algorithms for Solving Large-Scale Instances," *DIAMACS Implementation Challenge—The Shortest Path Problem*, 39 pages, 2006.
Malewicz, G., "A Work-Optimal Deterministic Algorithm for the Certified Write-All Problem with a Nontrivial Number of Asynchronous Processors," *SIAM J. Comput. 34*(4):993-1024, 2005.
Malewicz, G., et al., "Pregel: A System for Large-Scale Graph Processing," in *Comm. ACM SIGMOD/POD*, Indianapolis, Indiana, Jun. 6-10, 2010, 11 pages.
Meyer, U., et al., "Design and Implementation of a Practical I/O-efficient Shortest Paths Algorithm," in *Proc. 3rd Workshop on Multithreaded Architectures and Applications (MTAAP'09)*, Rome, Italy, May 2009, 12 pages.
Meyer, U., et al., "Δ-stepping: a parallelizable shortest path algorithm," *Journal of Algorithms 49*:114-152, 2003.
Munagala, K., et al., "I/O-Complexity of Graph Algorithms," in *Proc. 10th Annual ACM-SIAM Symp. on Discrete Algorithms*, pp. 687-694, 1999.
Olston, C., et al., "Pig Latin: A Not-So-Foreign Language for Data Processing," in *Proc. ACM SIGMOD Intl. Conf. on Management of Data*, pp. 1099-1110, 2008.
Pike, R., et al., "Interpreting the data: Parallel analysis with Sawzall," *Scientific Programming 13*(4):277-298, 2005.
Thorup, M., "Undirected Single-Source Shortest Paths with Positive Integer Weights in Linear Time," *J. ACM 46*(3):362-394, May 1999.
Valiant, L., "A Bridging Model for Parallel Computation," *Comm. ACM 33*(8):103-111, 1990.
Wikipedia, "Bulk synchronous parallel," 3 pages, [online] [retrieved on Mar. 10, 2010] retrieved from the internet <http://en.wikipedia.org/w/index.php?title=Bulk_synchronous_parallel&oldid=349030784>.
Wikipedia, "Distributed computing," 8 pages, [online] [retrieved Mar. 23, 2010] retrieved from the internet <http://en.wikipedia.org/w/index.php?title=Distributed_computing&oldid=351626983>.
Yoo, A., et al., "A Scalable Distributed Parallel Breadth-First Search Algorithm on BlueGene/L," in *Proc. 2005 ACM/IEEE Conf. on Supercomputing (SC'05)*, pp. 25-43, 2005.
Yu, Y., et al., "DryadLINQ: A System for General Purpose Distributed Data-Parallel Computing Using a High-Level Language," in *Proc. 8th USENIX Symp. on Operating Syst. Design and Implementation*, pp. 10-14, 2008.
Ziv, A., et al., "An On-Line Algorithm for Checkpoint Placement," *IEEE Transactions on Computers 46*(9):976-985, Sep. 1997.
Kang, F., et al., "Correlated Label Propagation with Application to Multi-label Learning," Proceedings of the 2006 IEEE Computer Society Conference on Computer Vision and Pattern Recognition (CVPR'06), 2006, pp. 1719-1726.
Rao, D., et al., "Ranking and Semi-supervised Classification on Large Scale Graphs Using Map-Reduce," Proceedings of the 2009 Workshop on Graph-based Methods of Natural Language Processing, ACL-IJCNLP 2009, pp. 58-65.

\* cited by examiner

RESOLVING CONFLICTING GRAPH MUTATIONS

CROSS-REFERENCE TO RELATED APPLICATIONS

This application claims the benefit of U.S. Provisional Application No. 61/477,559, filed Apr. 20, 2011, and U.S. Provisional Application No. 61/483,183, filed May 6, 2011, each of which is hereby incorporated herein by reference.

BACKGROUND

1. Technical Field

This invention pertains in general to distributed computing and in particular to graph processing using a distributed computer system.

2. Background Information

A distributed computing system includes multiple autonomous computers that communicate through a network. The computers interact with each other via the network to solve a common problem. For example, a complex problem can be divided into many smaller, less complex problems, and solved in parallel by the multiple computers in the distributed system.

Graph processing is a type of problem that can be solved using distributed systems. In graph processing, a computing problem is represented by a graph having a set of vertices connected by a set of edges. The graph can be used to model a real-world condition, and then the graph processing can act on the graph to analyze the modeled condition. For example, the World Wide Web can be represented as a graph where web pages are vertices and links among the pages are edges. In this example, graph processing can analyze the graph to provide information to a search engine process that ranks search results. Similarly, a social network can be represented as a graph and graph processing can analyze the graph to learn about the relationships in the social network. Graphs can also be used to model transportation routes, paths of disease outbreaks, citation relationships among published works, and similarities among different documents.

Efficient processing of large graphs is challenging. Graph processing often exhibits poor locality of memory access, very little work per vertex, and a changing degree of parallelism over the course of execution. Distribution over many computers exacerbates the locality issue, and increases the probability that a computer will fail during computation. These challenges continue to occur and are growing in significance as graph processing is used to model more real-world conditions and the sizes of the graphs increase.

SUMMARY OF THE INVENTION

The above and other needs are met by a method, a non-transitory computer-readable storage medium and a system for resolving conflicting graph mutations. Embodiments of the method comprise storing, in a worker system of a distributed computing system, graph data for at least a partition of a graph representing relationships among a set of tangible items that model a real-world condition having an associated problem. A plurality of conflicting mutation requests are received to mutate the graph. A conflict between the mutation requests is resolved with a conflict resolution function that lacks direct access to the graph data. The graph data is updated responsive to a result generated by resolving the conflict using the conflict resolution function.

Embodiments of the non-transitory computer-readable storage medium store executable computer program instructions. The computer program instructions include instructions for storing, in a worker system of a distributed computing system, graph data for at least a partition of a graph representing relationships among a set of tangible items that model a real-world condition having an associated problem. The instructions include instructions for receiving a plurality of conflicting mutation requests to mutate the graph. The instructions include instructions for resolving conflict between the mutation requests is with a conflict resolution function that lacks direct access to the graph data. The instructions also include instructions for updating the graph data responsive to a result generated by resolving the conflict using the conflict resolution function.

Embodiments of the system comprise a non-transitory computer readable storage medium storing processor-executable computer program instructions and a processor for executing the instructions. The computer program instructions include instructions for storing, in a worker system of a distributed computing system, graph data for at least a partition of a graph representing relationships among a set of tangible items that model a real-world condition having an associated problem. The instructions include instructions for receiving a plurality of conflicting mutation requests to mutate the graph. The instructions include instructions for resolving conflict between the mutation requests is with a conflict resolution function that lacks direct access to the graph data. The instructions also include instructions for updating the graph data responsive to a result generated by resolving the conflict using the conflict resolution function.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
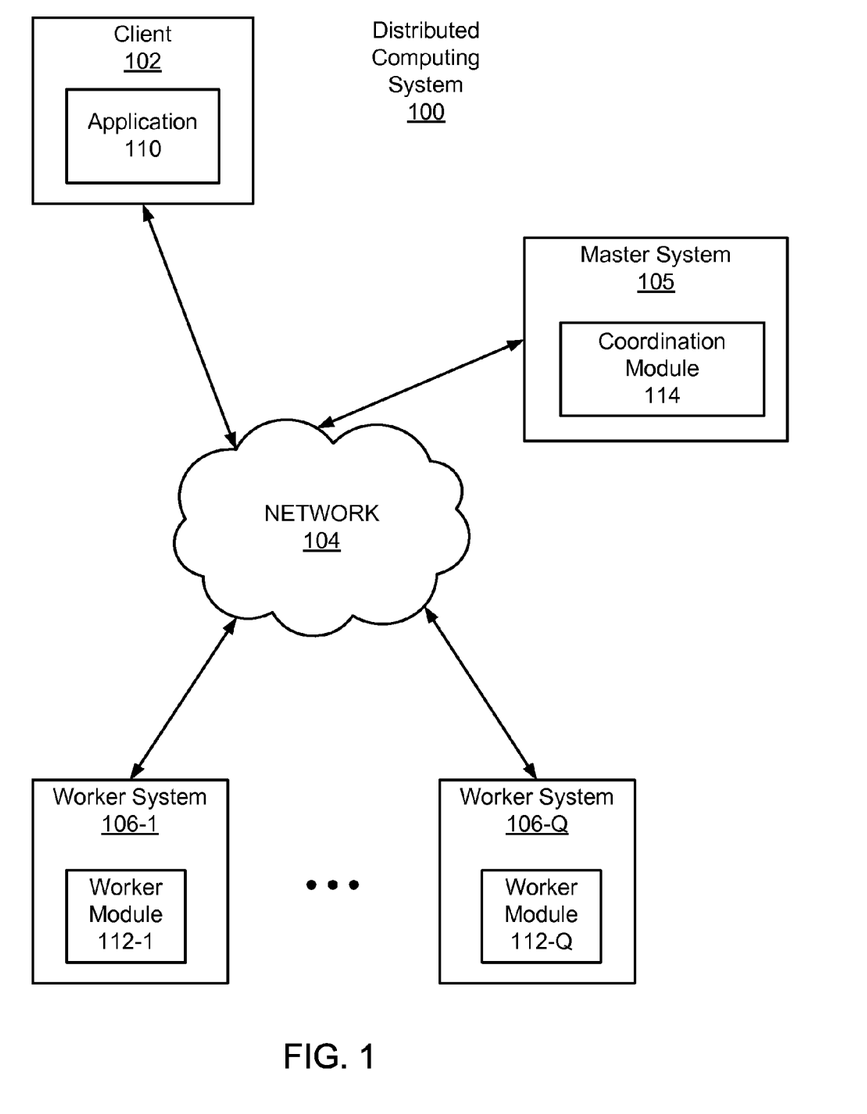
FIG. 1 is a high-level block diagram of a computing environment, according to one embodiment.

FIG. 1 is a high-level block diagram of a distributed computing system 100 for performing scalable fault-tolerant processing of large scale graphs. FIG. 1 illustrates a client 102, a master system 105 and worker systems 106 connected by a network 104. Collectively, the distributed computing system 100 is used to define a graph modeling real-world conditions as a set of relationships among a tangible set of items, such as documents and links on the Internet, transportation routes, or a social graph. In addition, the distributed computing system 100 is used to analyze the modeled conditions in order to solve one or more real-world problems associated with the conditions. This analysis may apply one or more algorithms to the graph, such as algorithms for shortest path computations, clustering, web page ranking, etc.

At a high-level, the client 102 is used to provide graph data describing the graph and to specify an algorithm to be performed on the graph data. In one embodiment, the graph is a directed graph and is represented as a set of vertices connected by a set of directed edges. As used herein, the vertices and the edges of a graph are collectively referred to as graph components. The master system 105 assigns partitions of the graph data to the worker systems 106. The worker systems 106 perform the specified algorithm on the partitions of the graph data within their respective ambits.

In more detail, the client 102 specifies a directed graph in which each vertex is uniquely identified by a string vertex identifier. Each vertex is also associated with a modifiable, user-defined value. For examiner, if a vertex represents a website, the value for the vertex can represent a relative importance of the website. The directed edges are associated with their source vertices, and each edge has a modifiable, user-defined value and a target vertex identifier. Vertices communicate directly with one another by sending messages, each of which includes a message value and the name of the destination vertex. In some embodiments, the vertices send requests to other vertices to mutate the graph, such as by adding new components, modifying values of existing components or removing existing components.

A typical computation includes initialization of a graph and execution of the algorithm on multiple worker systems 106. The algorithm performs a sequence of supersteps separated by global synchronization points until the algorithm terminates and produces an output. Within each superstep, the vertices compute in parallel, each executing a defined function that expresses the logic of the algorithm. A vertex can modify its state or that of its outgoing edges, receive messages sent to it in the previous superstep, send messages to other vertices (to be received in the next superstep), or mutate the topology of the graph.

The algorithm terminates based on every vertex voting to halt and no messages being in transit. In superstep 0 (the initial superstep), every vertex is in the active state; all active vertices participate in the computation of any given superstep. A vertex deactivates itself by voting to halt. Halting means that the vertex has no further work to do unless triggered externally, and that vertex will not execute in subsequent supersteps unless it receives a message. If reactivated by a message, a vertex must explicitly deactivate itself again. The algorithm as a whole terminates when all vertices are simultaneously inactive and there are no messages in transit.

The output of the algorithm is a set of values explicitly output by the vertices. For example, a clustering algorithm might generate a small set of disconnected vertices selected from a large graph. In another example, a graph mining algorithm might simply output aggregated statistics mined from the graph. The output represents a solution to the real-world problem associated with the modeled conditions involving the set of relationships among the set of items. For example, the output might be a set of search results, a transportation route, an analysis of the spread of a disease, or a recommendation for an item.

Turning now to the specific entities illustrated in FIG. 1, the client 102 is a computing device with a processor and a memory that includes an application 110 for providing the master system 105 with a user program and graph data. The user program defines the algorithm to perform on the graph data. An example of the algorithm is a shortest path algorithm that finds a shortest path between a single source vertex and every other vertex in the graph. The application 110 sends a copy of the user program to the master system 105. The application 110 also sends graph data or a location of the graph data to the master system 105.

The master system 105 is likewise a computing device with a processor and a memory. The master system 105 receives graph data and a user program from the client 102, assigns partitions of the graph data to the worker systems 106, provides copies of the user program to the worker systems 106, coordinates the parallel execution of the user program on the worker systems 106, and reports results of the execution to the client 102. The master system 105 includes a coordination module 114 that executes a copy of the user program that acts as a master or coordinator for the execution of the copies of the user program on the worker systems 106.

The coordination module 114 maintains a list of worker systems 106 that participate in a computation. The worker systems 106 send registration messages to the master system 105 and the coordination module 114 registers the worker systems 106 by assigning unique identifiers to the worker systems 106. The coordination module 114 maintains a list of the registered worker systems 106 which includes the identifiers of the registered worker systems 106 and the addressing information of the registered worker systems 106. For a respective registered worker system 106, the list includes information identifying one or more assigned graph partitions. In some embodiments, the coordination module 114 sends each worker system 106 the list of the registered worker systems 106.

The coordination module 114 determines the number of partitions the graph will have, assigns zero or more partitions to each worker system 106 and sends each worker system 106 its assigned zero or more partitions. A partition of a graph includes a subset of the vertices and edges of the graph. The number of partitions may be specified in the user program or determined by a partition function executed by the coordination module 114. For example, the default partitioning function may be a hash of a vertex identifier modulo N, where N is the number of partitions. In one embodiment, the master system 105 is not assigned any partitions of the graph.

The coordination module 114 sends each worker system 106 a copy of the user program and initiates the execution of the user program on the worker systems 106. More specifically, the coordination module 114 signals the beginning of a superstep. The coordination module 114 maintains statistics about the progress of a computation and the state of the graph, such as the total size of the graph, a histogram of its distribution of out-degrees, the number of active vertices, the timing and message traffic of recent supersteps.

In each superstep, the coordination module 114 receives messages from the worker systems 106. The messages include worker values representing the worker's contribution to a global value. The worker values are combined by the coordination module 114 into a single global value by applying an aggregation function that is supplied by the user program. For example, the aggregation function may sum all the incoming worker values to create a single global value. At the beginning of the next superstep, the master system 105 distributes the global value to the worker systems 106. The worker systems 106 use the global value when applying the algorithm in the user program. For example, in a page ranking algorithm that analyzes links between web-pages to rank the web-pages, the number of vertices across the entire graph is used as a denominator during the page ranking computation by each vertex during each superstep.

During the supersteps or after the supersteps are finished, the coordination module 114 aggregates results from the worker systems 106 and reports the results to the client 102. In some embodiments, the results include a set of values explicitly output by the vertices. In some embodiments, the results include a directed graph. Depending upon the problem, the results may describe an optimal solution to the problem, a sub-optimal but good solution to the problem, or an indication that a solution to the problem was not identified.

A worker system 106 is a computing device with a processor and a memory. The worker systems 106 and the master system 105 are similar types of systems in one embodiment. A worker system 106 includes a worker module 112 that stores graph data for one or more partitions of the graph. The graph data may include the state of each vertex in the partitions assigned to the worker system 106 where the state of each vertex contains its current value, a list of its outgoing edges (which includes the vertex name for the edge's destination and the edge's current value), and a flag specifying whether the vertex is active. The worker module 112 also stores and executes a copy of the user program on the one or more graph partitions stored on the worker system 106.

The worker module 112 executes supersteps of the user program in response to receiving instructions in the form of control messages originating from the master system 105. In one embodiment, at the beginning of a superstep, each worker module 112 resolves conflicts between any conflicting mutation requests received by the worker module 112 during a prior superstep for graph components within the partition assigned to the worker module. A result of resolving the conflict is used to update the graph data. The worker module 112 executes an algorithm of the user program on the updated graph data and also issues new mutation requests that are not effective until the next superstep.

Each worker module 112 may attempt to mutate the topology of the graph by issuing mutation requests. Conceptually speaking, the worker modules 112 execute the user program on each vertex, and each vertex will generate mutation requests directed at other vertices. Examples of mutation requests include requests to add a new vertex, remove an existing vertex, change the value of a vertex, add a new edge, remove an existing edge or change the value of an existing edge. Requests may be issued to mutate graph partitions within other worker modules 112, or the requests may be issued to mutate graph partitions within the worker module 112 that issued the request.

In one embodiment, because the distributed computing system 100 operates in synchronized supersteps, the mutation requests issued in one superstep are not effective until the subsequent superstep. If multiple mutation requests are received by a worker module 112 in an initial superstep, the worker module 112 places the mutation requests in a queue. The queued mutation requests are analyzed together in a subsequent superstep. Due to the synchronous nature in which the mutation requests are handled, some mutation requests may conflict by requesting different changes to the same graph component. For example, one mutation request may attempt to set the value of vertex V1 to "2" while another mutation request attempts to set the value of same vertex V1 to "3." These mutation requests are conflicting because they operate on the same vertex V1.

A worker module 112 that receives and queues conflicting mutation requests for graph components within the partition assigned to the worker module 112 resolves the conflict by using a user supplied conflict resolution function. The conflict resolution function implements a user supplied conflict resolution policy to resolve the conflict. Examples of conflict resolution policies may be arbitrarily selecting a value from the conflicting requests, discarding any conflicting requests, selecting the maximum value or minimum value from the conflicting requests, summing the values of the conflicting requests, as well as any other type of conflict resolution policy. The function generates a result that represents a resolution to the conflict, and the worker module 112 updates the graph data according to the result.

The conflict resolution function lacks direct access to the graph data in one embodiment. Because the conflict resolution function lacks direct access to the graph data, the user is prevented from writing a function that performs unintended actions, such as mistakenly overwriting information stored in the graph data. In some embodiments, the same conflict resolution function may also be used for resolving different types of conflicts, such as conflicts to add new graph components and conflicts to modify existing graph components. Thus, the user can write a single conflict resolution function to handle different types of mutation requests, which is more intuitive and easier to implement than multiple conflict resolution functions.

The execution of the supersteps continues as long as there are active vertices or there are messages in transit. When the supersteps are finished, the worker module 112 sends the results generated by executing the user program to the master system 105.

The network 140 represents the communication pathways between the client 102, the master system 105 and the worker systems 106. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
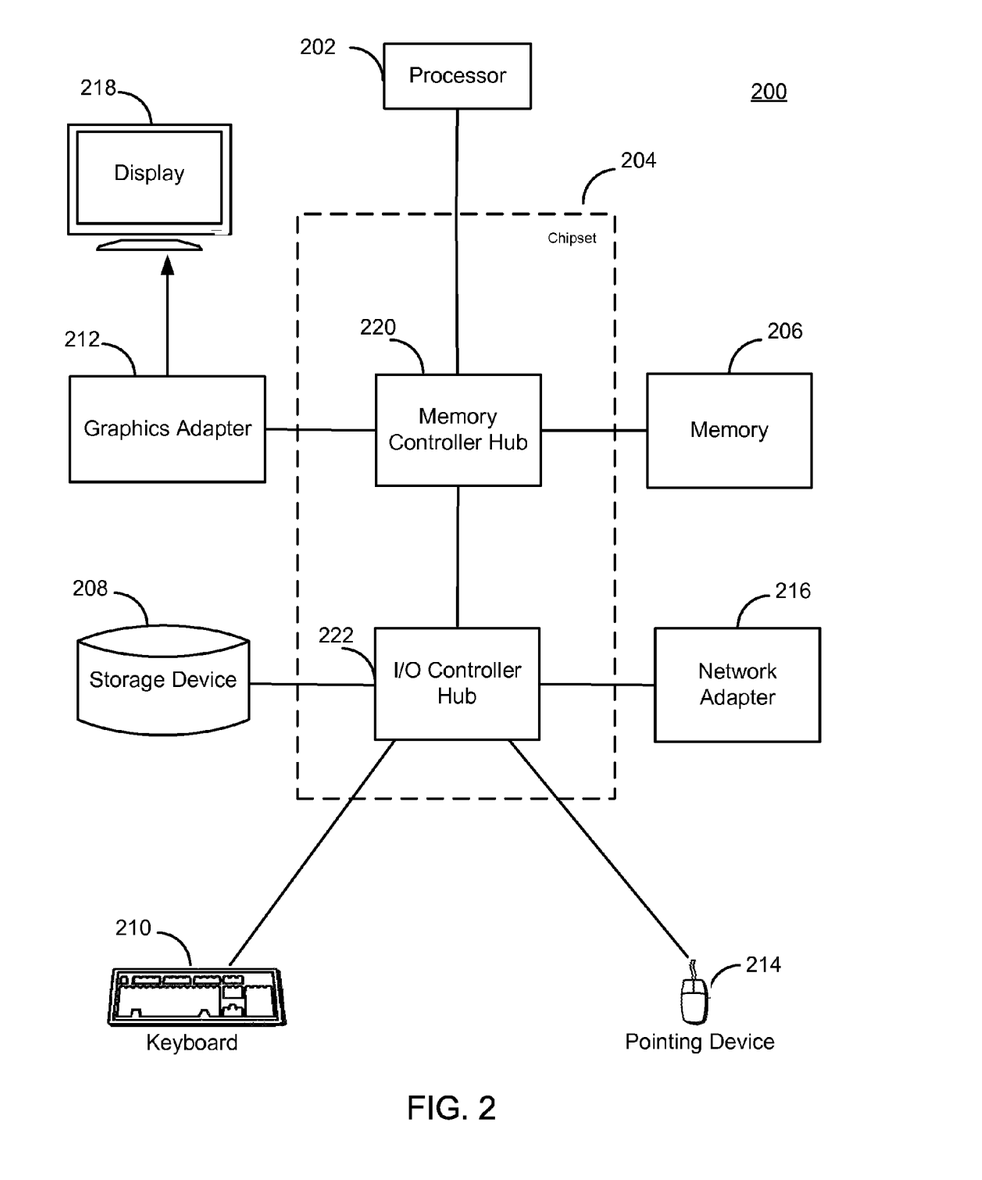
FIG. 2 is a high-level block diagram illustrating an example of a computer, according to one embodiment.

FIG. 2 is a high-level block diagram illustrating physical components of a computer 200 used as part of the client 102, master system 105 and/or worker system 106 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. In some embodiments, memory 206 includes high-speed random access memory, such as DRAM, SRAM, DDR RAM or other random access solid state memory devices.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 140.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
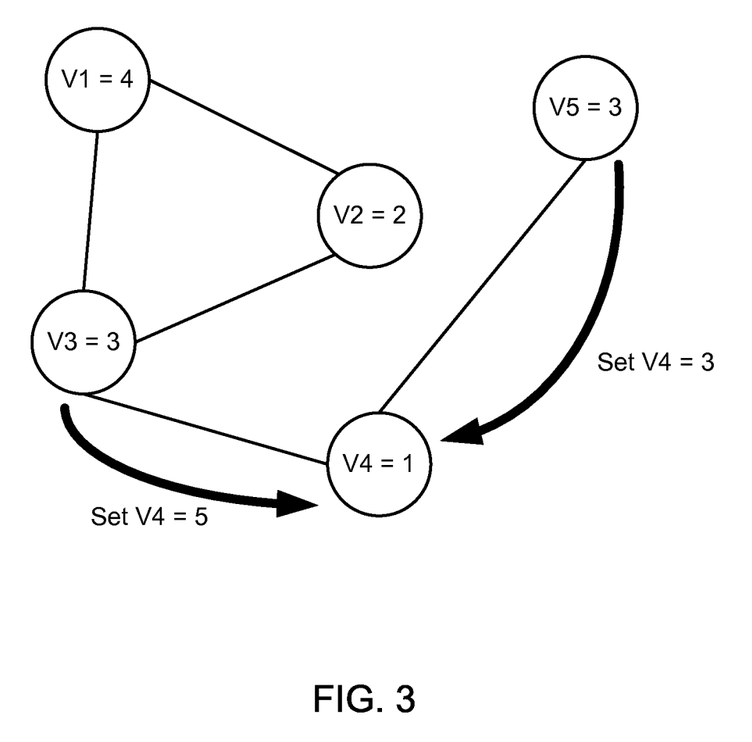
FIG. 3 is a conceptual view of a graph with conflicting graph mutations, according to one embodiment.

FIG. 3 is a conceptual view of a graph with conflicting graph mutations, according to one embodiment. The graph includes five vertices, V1, V2, V3, V4 and V5 connected with edges. The vertices may form a partition of the graph that is assigned to a single worker system 106. Alternatively, the vertices may form multiple partitions that are assigned to different worker systems 106. Each vertex has an existing value, as indicated by the number within the vertex. For example, vertex V4 has an existing value of 1.

Mutation requests are represented by the arrows leading towards vertex V4. As shown, vertex V3 has issued a mutation request to set the value of vertex V4 to 5. Vertex V5 has issued a mutation request to set the value of vertex V4 to 3. Both mutation requests are issued during a first superstep. During the beginning of the subsequent superstep, to resolve the conflict between the two mutation requests, the worker module 112 having the partition in which vertex V4 is located calls a conflict resolution function to establish a value for vertex V4. For example, the conflict resolution function may be called by passing the incoming mutation values of "5" and "3" and the existing vertex value of "1" as arguments to the conflict resolution function. The conflict resolution function then adds the values to generate a new value of "9" for vertex V4 and outputs this value as a result. The worker module 112 modifies vertex V4 by setting its value to "9" in accordance with the output of the conflict resolution function.

In other embodiments, the mutation requests may request mutations to the edges instead of the vertices. Mutation requests for edges and mutation requests for vertices may be handled by the same conflict resolution function or by different conflict resolution functions.

Figure 4:
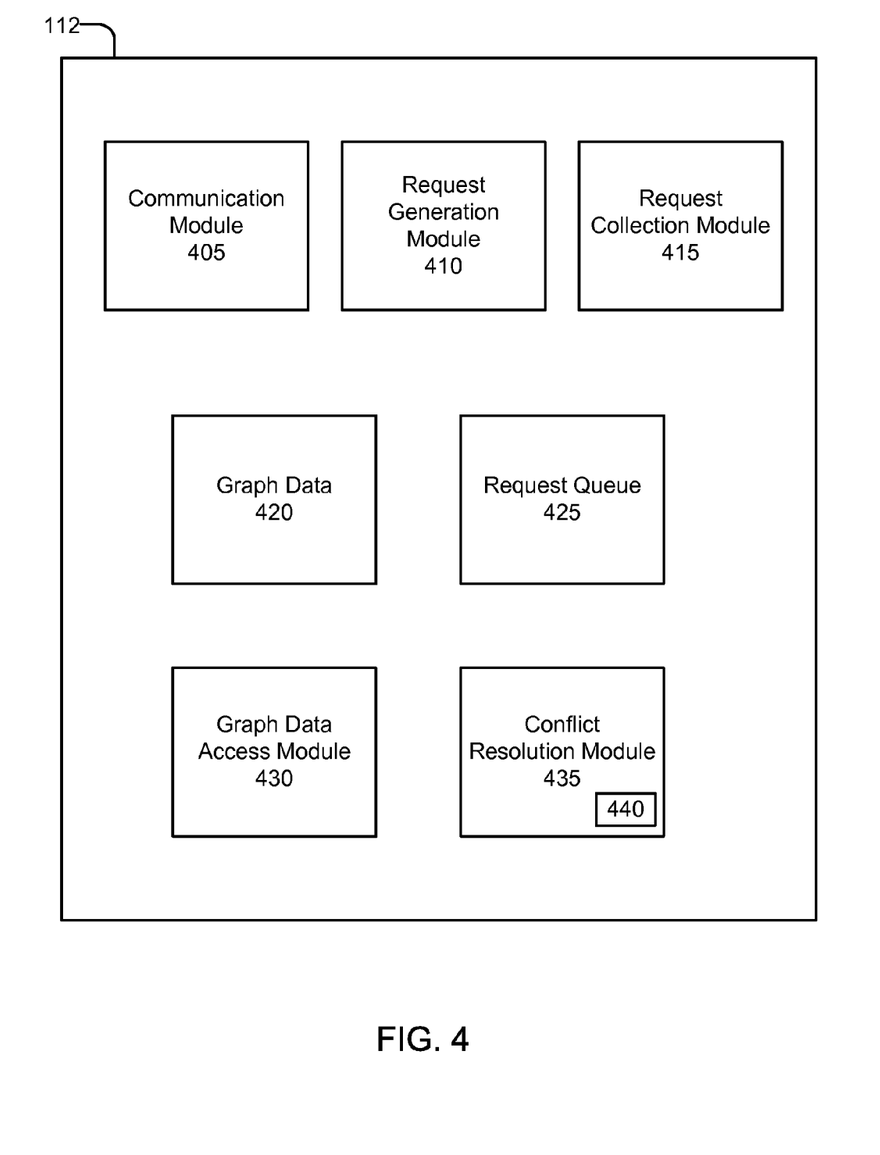
FIG. 4 is a high-level block diagram illustrating modules within a worker module for resolving conflicting graph mutations, according to one embodiment.

FIG. 4 is a high-level block diagram illustrating modules within the worker module 112 for resolving conflicting graph mutations, according to one embodiment. The worker module 112 includes a communication module 405, a request generation module 410, a request collection module 415, graph data 420, a request queue 425, a graph data access module 430 and a conflict resolution module 435.

The communication module 505 interfaces with the network 104 to communicate with the master system 105 and other worker systems 106. Prior to any supersteps, the communication module 505 receives configuration messages from the master system 105 to prepare the worker system 106 for executing a user program. The configuration messages assign one or more partitions of the graph to the worker systems 106, which are stored by the communication module 405 as graph data 420. The graph represents relationships among a set of tangible items that model a real-world condition having an associated problem.

The configuration messages may also include information about the overall configuration of the graph and which partitions of the graph are assigned to the other worker systems 106. This information allows the communication module 505 to send outgoing mutation requests to the other worker systems 106. Additionally, the configuration messages may include a conflict resolution function 440 that is provided by a user of the distributed computing system 100.

As the supersteps are under the control of the master system 105, the communication module 405 receives messages from the master system 105 to initiate supersteps. The communication module 405 also sends messages back to the master system 105 indicating that a superstep is completed on the worker system 105 and reporting results of the user program.

During the supersteps, the communication module 405 sends outgoing mutation requests to the other worker systems 105 for mutating partitions of the graph assigned to the other worker systems 105. The communication module 405 also receives incoming mutation requests from the other worker systems 105 for mutating partitions of the graph assigned to the worker system 105 on which the worker module 112 is stored (the "current worker system"). The mutation requests may represent, for example, requests to add a new vertex, remove an existing vertex, change the value of an existing vertex, add a new edge, remove an existing edge or change the value of an existing edge. The mutation requests may include unique identifiers for particular graph components (e.g., a vertex identifier or edge identifier) and a value for the graph component. A value may be any type of data that can be associated with a graph component, such as scalar values (e.g., integers, floating point numbers, characters), compound values (e.g. data arrays), data structures, etc.

The request generation module 410 generates graph mutation requests during execution of the user program. The request generation module 410 may generate either external or internal mutation requests. External mutation requests are requests for mutating partitions of the graph assigned to other worker systems 106 and are communicated to the other worker systems 106 via the communication module 405. Internal mutation requests are requests for mutating partitions of the graph assigned to the current worker system. Internal mutation requests are communicated directly to the request collection module 415.

The request collection module 415 receives graph mutation requests for mutating partitions of the graph of the current worker system and stores them into a request queue 425. The graph mutation requests may be internal mutation requests generated by the request generation module 410. The graph mutation requests may also be external mutation requests generated by other worker systems 106 and received by the request collection module 415 via the communication module 405.

The request queue 425 is used to store incoming mutation requests. Each mutation request can be stored with information that includes an identifier for the graph component being mutated and a value associated with the mutation. Because the distributing computing system 100 operates in synchronized supersteps, incoming mutation requests may not be acted on when they are received. Instead, the mutation requests are stored in the request queue 425 until they can be acted on in a subsequent superstep. In other words, the request queue 425 is filled during one superstep. Then, during a subsequent superstep, the request queue 425 is drained as the queued graph mutation requests are executed and conflicts between the queued graph mutation requests are resolved.

Some of the graph mutation requests received by the request collection module 415 and stored in the request queue 425 may by conflicting. Graph mutation requests conflict when two or more graph mutation requests attempt to make different graph mutations to the same component (e.g., vertex or edge) of the graph. For example, if one mutation request attempts to add a new vertex with a value of 1 and another mutation request attempts to add the same vertex with a value of 2, the requests are conflicting. As another example, if one mutation request attempts to set an existing vertex to a value of 1 and another vertex attempts to set the same existing vertex to a value of 2, the requests are conflicting.

The graph data 420 includes information about the one or more partitions of the graph assigned to the current worker system, such as values for the graph components (e.g. vertices and edges) assigned to the current worker system. In one embodiment, the graph data may be organized in a vertex-centric manner and include, for each vertex, an identifier for the vertex, a current value of the vertex, a list of its outgoing edges (which includes the vertex identifier for the edge's destination and the edge's current value), and a flag specifying whether the vertex is active. The graph data 420 can be loaded from the master system 105 by the communication module 405. The graph data 420 can be also be updated by the graph data access module 430 once any conflicting mutation requests in the request queue 425 are resolved.

The conflict resolution module 435 resolves any conflicts between conflicting mutation requests stored in the request queue 425. As the distributed computing system 100 operates in synchronized supersteps, the mutation requests may be received by the request collection module 415 and stored in the request queue 425 in one superstep and then resolved by the conflict resolution module 435 in a subsequent superstep.

The conflict resolution module 435 uses a conflict resolution function 440 that applies a conflict resolution policy to determine a solution to the conflict. The conflict resolution function 440 can be viewed as a block of code that groups one or more program statements into a functional unit. The function 440 can be reusable and executed from different points in a program as needed. The conflict resolution function 440 is provided by a user of the distributed computing system 100 and applies a policy that is tailored to the specific needs to the user program being executed and the type of graph data 420 that is being processed. The responsibility of providing the conflict resolution function 420 is left to the user of the distributed computing system 100 because it is the user who is in the best position to know what policy should be applied for a given graph and user program. Examples of conflict resolution policies may be arbitrarily selecting a value from the conflicting requests, discarding any conflicting requests, selecting the maximum value or minimum value from the conflicting requests, summing the values of the conflicting requests, as well as any other type of conflict resolution policy.

The conflict resolution function 440 also lacks direct access to the graph data 420. The conflict resolution function 440 lacks direct access in the sense that the conflict resolution function 440 itself does not have the ability to directly read or make modifications to the contents of the graph data 420. Information about the values of the conflicting mutation requests and a value of an existing graph component are instead passed as arguments into the conflict resolution function 440. The information about a value can be the value itself, or indirect information about the value, such as a pointer to the value. A result that represents a resolution to the conflict is then determined as a function of the values of the mutation request values and a value of an existing graph component (if provided) provided to the conflict resolution function 440.

Isolating the conflict resolution function 440 from the graph data 420 provides an additional layer of protection for the graph data 420. For instance, if the conflict resolution function 440 could directly access the graph data 420, there would be a risk that the user would make an error and write a conflict a resolution function 420 that modifies portions of the graph data 420 that are meant to be untouched. This risk grows as the complexity of the graph data 420 increases. The risk is also increased for users that are inexperienced with the use of graph based processing systems. By removing the ability of the conflict resolution function 440 to directly access the graph data 420, unintended changes to the graph data 420 can be avoided and the integrity of the graph data 420 can be preserved.

Because the conflict resolution function 440 cannot directly access the graph data 420, it simply outputs a result that represents a solution to the conflict determined by applying the conflict resolution policy. The conflict resolution function 440 can output a result, for example, by returning the result, storing the result in a globally accessible variable, or any other method of producing a result. The result can include a value that is determined to be the correct value for a new graph component or for an existing graph component. The result is then used by the graph data access module 430 to update the graph data 420.

As a specific example, in an object-oriented programming environment that uses classes as templates for defining objects, there may be a pre-defined class known as the Vertex class. The graph data 420 is stored in variables of the Vertex class. The conflict resolution function 440 is a virtual method that is defined as a method of a class that is different from the Vertex class. Because the virtual method is defined in a different class, it does not inherit from the Vertex class and thus does not have direct access to modify the graph data 420 in the Vertex class. The values for the graph data 420 can instead be provided to the virtual method as arguments when calling the virtual method. The virtual method applies a user defined conflict resolution policy to the arguments and then outputs a result of applying the policy.

Sample code including a virtual method that serves as a conflict resolution function 440 for vertex mutations is shown below:

1 class VertexInsertionCombiner : public graph::AddVertexCombiner {
2 virtual void Combine(VertexValueIterator *values) {
int value=0;
for (; !values->Done( ) values->Next( ) {
5 value+=values->Value( )
6 }

7 Output(value);
8 }
9 };

In line 1 of the code, a new class VertexInsertionCombiner is defined. In line 2 of the code, the values for conflicting vertex mutation requests are supplied to a Combine method as an argument for the parameter VertexValueIterator *values. In lines 4 and 5 of the code, the Combine method adds the input values together and stores them in the value variable as a single value. For example, suppose a first request is for creating vertex X with a value of 1 and a second request is for creating vertex X with a value of 2. This combiner method sums the values to create a value of 3. In line 7 of the code, the value variable is output as a result that represents a resolution of the conflict between the conflicting mutation requests. It should be noted that this code assumes that the values in the conflicting mutation requests are of the integer data type, but in other embodiments the values may be of a different data type.

Sample code including a virtual method that serves as a conflict resolution function 440 for edge mutations is shown below:
1 class NoMultiEdgesCombiners : public graph::AddEdgeCombiner {
2 virtual void Combine(EdgeValueIterator *values) {
3 Output(values->Value( ));
4 }
5 };

In line 1 of the code, a new class NoMultiEdgesCombiners is defined. In line 2 of the code, the values for conflicting vertex requests are supplied to a Combine method as an argument for the parameter VertexValueIterator *values. In line 3 of the code, an arbitrary value is selected from among the provided values and output as a result of the method.

In one embodiment, the conflict resolution function 440 does not distinguish between existing and non-existing graph components. The same conflict resolution function 440 can thus be used for both (1) conflicting mutation requests to add new graph components and (2) conflicting mutation requests to modify existing graph components. For example, in the VertexInsertionCombiner code, the value of an existing vertex can also be supplied to the Combine method in the argument for the parameter VertexValueIterator *values in addition to the values of the conflicting mutation requests. As a result, the user can write a single conflict resolution function 440 to handle different types of mutation requests, which is more intuitive and easier to implement than multiple conflict resolution functions 440.

In one embodiment, no conflict resolution function 440 may be provided by the user. In this case, the conflict resolution module 435 applies a default conflict resolution policy to resolve the conflict, such as by arbitrarily selecting from among conflicting vertex mutation requests or creating multiple edges when there are conflicting edge mutation requests.

The graph data access module 430 updates the graph data 420 once a conflict between the mutation requests is resolved. Specifically, the graph data access module 430 uses the result generated by the conflict resolution function 440 to update the graph data 420. If a new graph component is being added, the graph data 420 is updated by adding a new graph component that is set to a value specified by the result of the conflict resolution function 440. If an existing graph component is being updated, the graph data 420 is updated by replacing an existing value of the graph component with the value specified by the result of the conflict resolution function 440. The graph data access module 430 has direct access to the graph data 420 so that it can add new components to the graph data 420, modify existing components in the graph data, or remove existing components in the graph data 420.

Figure 5:
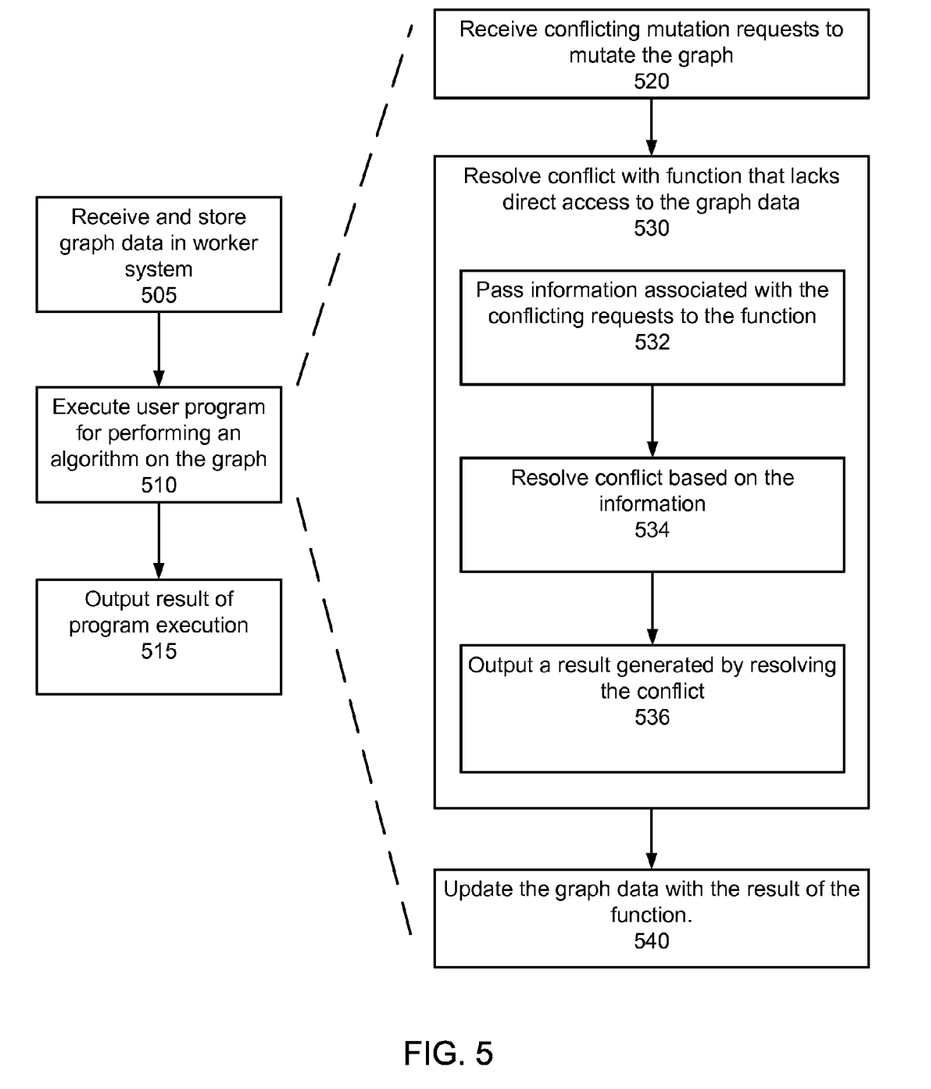
FIG. 5 is a flow diagram that illustrates a process for resolving conflicting graph mutations, according to one embodiment.

FIG. 5 is a flow diagram that illustrates a process for resolving conflicting graph mutations, according to one embodiment. The graph represents relationships among a set of tangible items that model the real-world problem, and the output of the process represents a solution to the modeled real-world problem. In one embodiment, the steps shown in FIG. 5 are performed by the modules of the worker module 112 of the worker system 106.

In step 505, the communication module 405 receives and stores graph data 420 representing one or more partitions of the graph assigned to the worker system 106. In step 510, various modules of the worker module 112 execute a user program for performing an algorithm on the graph, each worker module 112 analyzing the relationship among the items in the graph to identify a piece of the solution to the problem modeled by the graph. The execution may be spread over several supersteps coordinated by the master system 105, and conflicting graph mutation requests may be received during one superstep and resolved during a subsequent superstep. In step 515, the worker module 112 outputs results of the program execution to the master system 105, such as the values of the edges or vertices of the graph partition assigned to the worker module 112. The master system 105 then determines a solution to the modeled problem using the results received from each of the worker systems 106.

Step 510, executing the user program, can be sub-divided into several sub steps 520-540. In step 520, the request collection module 415 receives conflicting mutation requests to mutate the graph. In step 530, the conflict resolution module 435 resolves the conflict between the conflicting mutation requests with a conflict resolution function 440 that lacks direct access to the graph data. In one embodiment, the same conflict resolution function 440 may be used for both mutation requests that modify existing graph components and mutation requests that add new graph components. In one embodiment, the graph data 420 may be stored in variables of a first class of objects and the conflict resolution function 440 may be a function of a second class of objects that lacks inheritance of the variables in the first class. In step 540, the graph access module 430 updates the graph data responsive to a result generated by the conflict resolution function 440.

Steps 520-540 may repeat with each round of supersteps. In some embodiments, as steps 520-540 repeat, step 520 for receiving the conflicting mutation request may occur during one superstep, and step 530 for resolving the conflict and step 540 for updating the graph data may not occur until a subsequent superstep.

Step 530, resolving the conflict, can additionally be divided into several sub steps 532-536. In step 532, information associated with the conflicting mutation requests (e.g., values or pointers to the values) is passed to the conflict resolution function 440 as arguments when calling the function 440. The information associated with the conflicting mutation requests may include information about values of the conflicting mutation requests The information associated with the conflicting mutation requests may also include information about a value of an existing graph component that is being modified by the conflicting mutation requests. In step 534, the conflict is resolved by the conflict resolution function 440 based on the values of the conflicting requests and the value of the existing graph component if passed to the conflict resolution function. The conflict resolution function 440 may apply a user-defined conflict resolution policy to resolve the conflict. In step 536, a result generated by resolving the conflict is output by the conflict resolution function 440. The result represents a resolution to the conflict that can be used to update the graph data 420.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for resolving conflicting graph mutations. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for resolving conflicting graph mutations implemented by a computer comprising at least one processor, the method comprising:
    storing, in a worker system of a distributed computing system, graph data for at least a partition of a graph representing relationships among a set of tangible items that model a real-world condition having an associated problem, the distributed computing system operating in synchronized steps under control of a master system;
    receiving a plurality of conflicting mutation requests to mutate the graph during a first step of the synchronized steps, the conflicting mutation requests including respective values for a graph component;
    resolving a conflict between the respective values of the conflicting mutation requests during a second step of the synchronized steps that follows the first step, the conflict resolved with a conflict resolution function that lacks direct access to the graph data; and
    updating the graph data responsive to a result generated by resolving the conflict using the conflict resolution function.

2. The method of claim 1, wherein resolving a conflict between the respective values of the mutation requests with the conflict resolution function comprises:
    passing, as one or more arguments to the conflict resolution function, information corresponding to the respective values of the conflicting mutation requests;
    resolving, with the conflict resolution function, a conflict between the respective values of the conflicting mutation requests based on the information corresponding to the respective values of the conflicting mutation requests; and
    outputting, from the conflict resolution function, the result generated by resolving the conflict.

3. The method of claim 2, wherein the plurality of conflicting mutation requests are conflicting mutation requests to modify an existing graph component, and wherein:
    passing information to the conflict resolution function comprises passing information corresponding to the respective values of the conflicting mutation requests and information corresponding to a value of the existing graph component, and
    resolving the conflict comprises resolving the conflict between the respective values of the conflicting mutation requests based on the information corresponding to the respective values of the conflicting mutation requests and the information corresponding to the value of the existing graph component.

4. The method of claim 1, wherein the plurality of conflicting mutation requests are conflicting mutation requests to modify an existing graph component, and further comprising:
    receiving an additional plurality of conflicting mutation requests to add a new component to the graph;
    resolving an additional conflict between the additional mutation requests with the conflict resolution function that lacks direct access to the graph data; and
    updating the graph data responsive to an additional result generated by resolving the additional conflict with the conflict resolution function.

5. The method of claim 1, wherein storing the graph data comprises storing the graph data in variables of a first class of an object oriented programming language, and resolving a conflict between the respective values of the conflicting mutation requests with a conflict resolution function comprises resolving the conflict with a function of a second class of the object oriented programming language that lacks inheritance of the variables in the first class.

6. A non-transitory computer readable storage medium storing executable computer program instructions for resolving conflicting graph mutations, the instructions comprising instructions for:
    storing, in a worker system of a distributed computing system, graph data for at least a partition of a graph representing relationships among a set of tangible items that model a real-world condition having an associated problem, the distributed computing system operating in synchronized steps under control of a master system;

receiving a plurality of conflicting mutation requests to mutate the graph during a first step of the synchronized steps, the conflicting mutation requests including respective values for a graph component;

resolving a conflict between the respective values of the conflicting mutation requests during a second step of the synchronized steps that follows the first step, the conflict resolved with a conflict resolution function that lacks direct access to the graph data; and updating the graph data responsive to a result generated by resolving the conflict using the conflict resolution function.

7. The storage medium of claim 6, wherein resolving a conflict between the respective values of the mutation requests with the conflict resolution function comprises:

passing, as one or more arguments to the conflict resolution function, information corresponding to the respective values of the conflicting mutation requests;

resolving, with the conflict resolution function, a conflict between the respective values of the conflicting mutation requests based on the information corresponding to the respective values of the conflicting mutation requests; and outputting, from the conflict resolution function, the result generated by resolving the conflict.

8. The storage medium of claim 7, wherein the plurality of conflicting mutation requests are conflicting mutation requests to modify an existing graph component, and wherein:

passing information to the conflict resolution function comprises passing information corresponding to the respective values of the conflicting mutation requests and information corresponding to a value of the existing graph component, and resolving the conflict comprises resolving the conflict between the respective values of the conflicting mutation requests based on the information corresponding to the respective values of the conflicting mutation requests and the information corresponding to the value of the existing graph component.

9. The storage medium of claim 6, wherein the plurality of conflicting mutation requests are conflicting mutation requests to modify an existing graph component, and the instructions further comprise instructions for:

receiving an additional plurality of conflicting mutation requests to add a new component to the graph;

resolving an additional conflict between the additional mutation requests with the conflict resolution function that lacks direct access to the graph data; and updating the graph data responsive to an additional result generated by resolving the additional conflict with the conflict resolution function.

10. The storage medium of claim 6, wherein storing the graph data comprises storing the graph data in variables of a first class of an object oriented programming language, and resolving a conflict between the respective values of the conflicting mutation requests with a conflict resolution function comprises resolving the conflict with a function of a second class of the object oriented programming language that lacks inheritance of the variables in the first class.

11. A system for resolving conflicting graph mutations, the system comprising:

a non-transitory computer readable storage medium storing processor-executable computer program instructions, the instructions comprising instructions for:

storing, in a worker system of a distributed computing system, graph data for at least a partition of a graph representing relationships among a set of tangible items that model a real-world condition having an associated problem, the distributed computing system operating in synchronized steps under control of a master system;

receiving a plurality of conflicting mutation requests to mutate the graph during a first step of the synchronized steps, the conflicting mutation requests including respective values for a graph component;

resolving a conflict between the respective values of the conflicting mutation requests during a second step of the synchronized steps that follows the first step, the conflict resolved with a conflict resolution function that lacks direct access to the graph data; and updating the graph data responsive to a result generated by resolving the conflict using the conflict resolution function; and a processor for executing the instructions.

12. The system of claim 11, wherein resolving a conflict between the respective values of the mutation requests with the conflict resolution function comprises:

passing, as one or more arguments to the conflict resolution function, information corresponding to the respective values of the conflicting mutation requests;

resolving, with the conflict resolution function, a conflict between the respective values of the conflicting mutation requests based on the information corresponding to the respective values of the conflicting mutation requests; and outputting, from the conflict resolution function, the result generated by resolving the conflict.

13. The system of claim 12, wherein the plurality of conflicting mutation requests are conflicting mutation requests to modify an existing graph component, and wherein:

passing information to the conflict resolution function comprises passing information corresponding to the respective values of the conflicting mutation requests and information corresponding to a value of the existing graph component, and resolving the conflict comprises resolving the conflict between the respective values of the conflicting mutation requests based on the information corresponding to the respective values of the conflicting mutation requests and the information corresponding to the value of the existing graph component.

14. The system of claim 11, wherein the plurality of conflicting mutation requests are conflicting mutation requests to modify an existing graph component, and the instructions further comprise instructions for:

receiving an additional plurality of conflicting mutation requests to add a new component to the graph;

resolving an additional conflict between the additional mutation requests with the conflict resolution function that lacks direct access to the graph data; and updating the graph data responsive to an additional result generated by resolving the additional conflict with the conflict resolution function.

15. The system of claim 11, wherein storing the graph data comprises storing the graph data in variables of a first class of an object oriented programming language, and resolving a conflict between the respective values of the conflicting mutation requests with a conflict resolution function comprises resolving the conflict with a function of a second class of the object oriented programming language that lacks inheritance of the variables in the first class.

* * * * *